United States Patent
Kato et al.

(10) Patent No.: US 10,168,702 B2
(45) Date of Patent: Jan. 1, 2019

(54) AUTONOMOUS DRIVING CONTROL DEVICE

(71) Applicant: CLARION CO., LTD., Saitama (JP)

(72) Inventors: Ryohei Kato, Saitama (JP); Jun Li, Saitama (JP); Kentaro Daikoku, Saitama (JP); Takaaki Shiina, Saitama (JP); Hiroaki Senoo, Saitama (JP); Shinichi Amaya, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/327,435

(22) PCT Filed: Aug. 19, 2015

(86) PCT No.: PCT/JP2015/073231
§ 371 (c)(1),
(2) Date: Jan. 19, 2017

(87) PCT Pub. No.: WO2016/031647
PCT Pub. Date: Mar. 3, 2016

(65) Prior Publication Data
US 2017/0176993 A1    Jun. 22, 2017

(30) Foreign Application Priority Data

Aug. 25, 2014 (JP) ................. 2014-170117

(51) Int. Cl.
*G05D 1/00* (2006.01)
*B60W 30/14* (2006.01)
(Continued)

(52) U.S. Cl.
CPC ........... *G05D 1/0088* (2013.01); *B60W 30/14* (2013.01); *B60W 30/18154* (2013.01);
(Continued)

(58) Field of Classification Search
CPC .............. G05D 1/0088; G05D 1/0274; B60W 30/18154; B60W 30/18163; B60W 40/04; G01C 21/3415; G01C 21/3492
See application file for complete search history.

(56) References Cited

U.S. PATENT DOCUMENTS

| 8,712,624 | B1 * | 4/2014 | Ferguson ........ B60W 30/18154 |
| | | | 701/117 |
| 9,188,985 | B1 * | 11/2015 | Hobbs .................... G01C 21/34 |
| 2012/0310465 | A1 | 12/2012 | Boatright et al. |

FOREIGN PATENT DOCUMENTS

| JP | 8-315290 A | 11/1996 |
| JP | 2001-301484 A | 10/2001 |

(Continued)

OTHER PUBLICATIONS

International Preliminary Report on Patentability issued for corresponding PCT/JP2015/073231.
(Continued)

*Primary Examiner* — Calvin Cheung
(74) *Attorney, Agent, or Firm* — IP Business Solutions, LLC

(57) ABSTRACT

Travelling corresponding to characteristics of autonomous driving can be performed. An autonomous driving control device 3 mounted on a vehicle and controlling autonomous driving, includes a storage unit 32 that stores map data 32*a*, a route extraction unit 311 that extracts a plurality of routes from an origin O to a destination D based on the map data 32*a*, a determination unit 312 that determines whether or not to change to another route in response to a situation of an intersection when the vehicle approaches the intersection while the vehicle is traveling in one route of the routes extracted by the route extraction unit 311, and an autonomous driving control unit 313 that controls autonomous driving based on the determination of the determination unit 312.

6 Claims, 9 Drawing Sheets

(51) Int. Cl.
*B60W 40/04* (2006.01)
*B60W 30/18* (2012.01)
*G01C 21/34* (2006.01)
*G05D 1/02* (2006.01)

(52) U.S. Cl.
CPC ...... *B60W 30/18163* (2013.01); *B60W 40/04* (2013.01); *G01C 21/3415* (2013.01); *G01C 21/3492* (2013.01); *G05D 1/0212* (2013.01); *G05D 1/0274* (2013.01); *G05D 2201/0213* (2013.01)

(56) References Cited

FOREIGN PATENT DOCUMENTS

| | | |
|---|---|---|
| JP | 2006-58100 A | 3/2006 |
| JP | 2008-51774 A | 3/2008 |
| JP | 2008-70174 A | 3/2008 |
| JP | 2009-236520 A | 10/2009 |
| JP | 2010-43917 A | 2/2010 |
| JP | 2011-25752 A | 2/2011 |
| JP | 2014-133477 A | 7/2014 |
| JP | 2014-517303 A | 7/2014 |

OTHER PUBLICATIONS

Written Opinion of the International Searching Authority issued for corresponding PCT/JP2015/073231.
International Search Report issued for corresponding PCT/JP2015/073231 application.
Written Opinion of the International Search Authority issued for corresponding PCT/JP2015/073231 application.
Japanese Office Action mailed by Japanese Patent Office dated Jul. 3, 2018 in the corresponding Japanese patent application No. 2014-170117.

\* cited by examiner

FIG.5A

J1(J1a) {
</CANDIDATE ROUTE K1 INFORMATION>
　　　　</ESTIMATED TRAVEL TIME PERIOD DIFFERENCE>60 —— J11
　　　　</TRIP DISTANCE DIFFERENCE>100 —— J12
</CANDIDATE ROUTE 1 INFORMATION>
}

J1(J1b) {
</CANDIDATE ROUTE K2 INFORMATION>
　　　　</ESTIMATED TRAVEL TIME PERIOD DIFFERENCE>120 —— J11
　　　　</TRIP DISTANCE DIFFERENCE>200 —— J12
</CANDIDATE ROUTE 2 INFORMATION>
}

</INTERSECTION N1 INFORMATION>
　　　</STRAIGHT-FORWARD TRAVELING TIME ROUTE>BASIC ROUTE —— J201
　　　</RIGHT-TURN TIME ROUTE>CANDIDATE ROUTE K1 —— J202
　　　</LEFT-TURN TIME ROUTE>NON-ROUTE —— J203
　　　</RIGHT TURN DIFFICULTY DEGREE>4 —— J204
　　　</ACCIDENT OCCURRENCE PROBABILITY>2 —— J205
　　　</EXCLUSIVE LANE PRESENCE OR ABSENCE>PRESENT —— J206
　　　</RIGHT-TURN SIGNAL PRESENCE OR ABSENCE>PRESENT —— J207
　　　</WHITE LINE FACILITY SITUATION>COMPLETED —— J208
　　　</SIGNAL FACILITY POSITION>○○○ —— J209
　　　</BLUE SIGNAL LIGHTING-UP TIME PERIOD>29 —— J210
　　　</RED SIGNAL LIGHTING-UP TIME PERIOD>29 —— J211
　　　</PEDESTRIAN SIGNAL WAITING TIME PERIOD DISPLAY PRESENCE OR ABSENCE>PRESENT —— J212

FIG.8A

| PRESENT SIGNAL STATE | SIGNAL STATE OF PREVIOUS TIME |
|---|---|
| BLUE | — |

FIG.8B

| PRESENT SIGNAL STATE | SIGNAL STATE OF PREVIOUS TIME |
|---|---|
| YELLOW | BLUE |

CS  RS

US 10,168,702 B2

AUTONOMOUS DRIVING CONTROL DEVICE

TECHNICAL FIELD

The present invention relates to an autonomous driving control device.

BACKGROUND ART

As a background art of the present technical field, there is cited Japanese Patent Laid-Open No. 2009-236520 (Patent Literature 1). This publication indicates that "at a time of deviating from a guide route (S39), a plurality of routes from the present location to the destination are searched for (S42), and a driver is caused to select one of the plurality of routes as a guide route. When the guide route is decided by selection of a user (S44), guidance to the destination is started based on the guide route (S47). During travel without deviating from the guide route, other search routes than the search route of the guide route, and further route selection buttons are displayed, as well as the search route of the guide route on the map, on the screen of a touch screen type display unit 27 (S48). In each of the selection buttons, information on a required distance, a required time period and the like for a corresponding route is displayed. When the driver presses the selection button (S49), the guide route is changed to the route of the selection button, and thereafter, route guidance is returned to (S47).".

CITATION LIST

Patent Literature

Patent Literature 1: Japanese Patent Laid-Open No. 2009-236520

SUMMARY OF INVENTION

Technical Problem

Incidentally, in recent years, development of the technology concerning autonomous driving has been advanced. When the route to a destination is searched for as in an on-vehicle device described in Patent Literature 1, and the vehicle travels on the route searched for by autonomous driving, performing travel corresponding to the characteristics of the autonomous driving is required.

Thus the present invention has an object to provide an autonomous driving device that realizes travel corresponding to characteristics of autonomous driving, and an autonomous driving control system.

Solution to Problem

In order to achieve the above described object, the present invention is an autonomous driving control device mounted on a vehicle and controlling autonomous driving, and includes a storage unit that stores map information, a route extraction unit that extracts a plurality of routes from an origin to a destination based on the map information, a determination unit that determines whether or not to change to another route in response to a situation of an intersection when the vehicle approaches the intersection while the vehicle is traveling on one route of the routes extracted by the route extraction unit, and an autonomous driving control unit that controls autonomous driving based on determination of the determination unit.

Advantageous Effects of Invention

According to the present invention, traveling corresponding to the characteristics of autonomous driving can be performed.

BRIEF DESCRIPTION OF DRAWINGS

FIGS. 5A and 5B are diagrams illustrating examples of candidate route information and intersection information.

FIGS. 8A and 8B are diagrams explaining signal monitoring processing.

DESCRIPTION OF EMBODIMENTS

Figure 1:
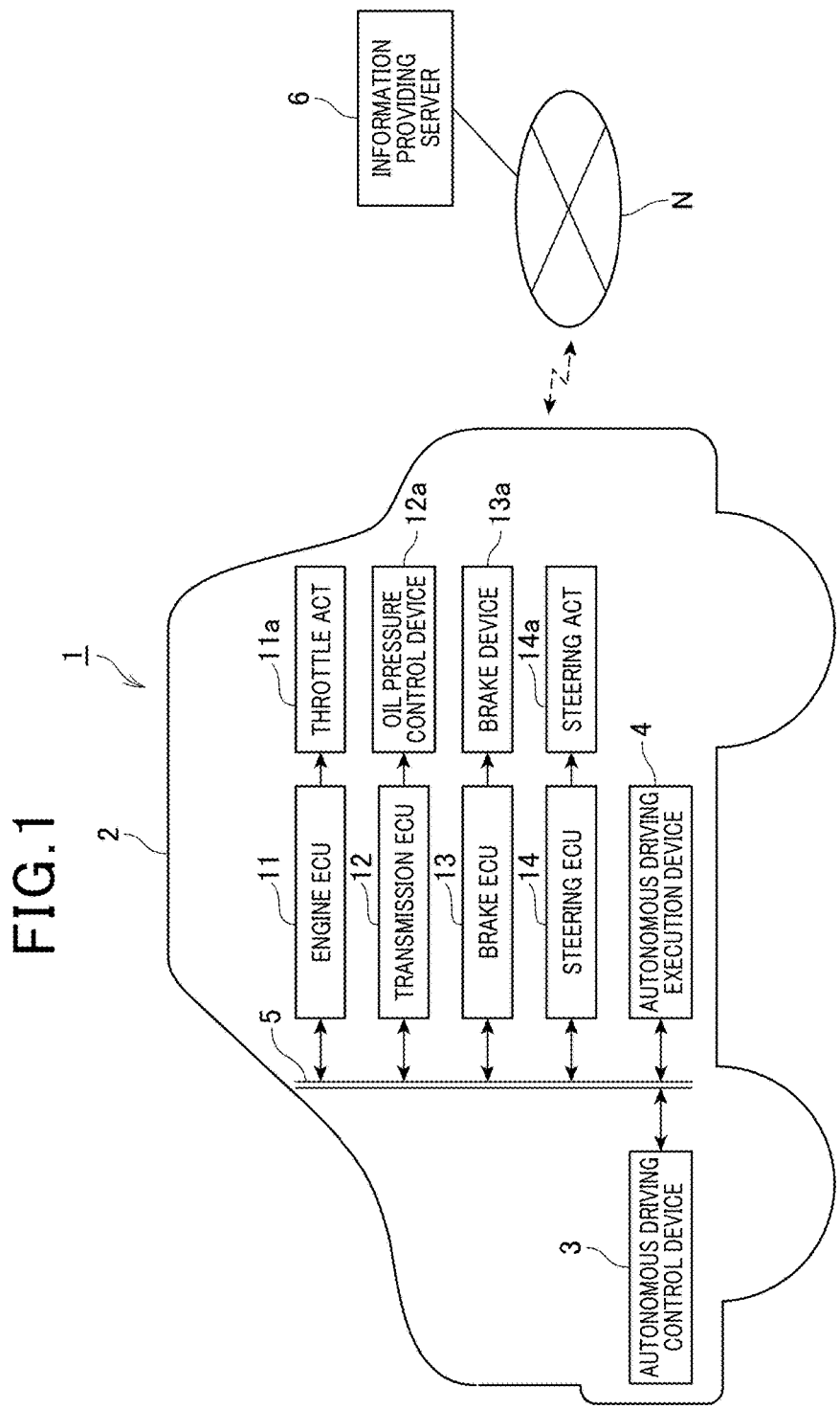
FIG. 1 is a functional block diagram of an autonomous driving system including an autonomous driving control device.

FIG. 1 is a diagram illustrating a configuration of an autonomous driving control system 1 including an autonomous driving control device 3 of the present embodiment.

The autonomous driving control system 1 is a system that is mounted on a vehicle 2, and has a purpose of autonomous traveling (hereinafter referred to as "autonomous driving") of the vehicle 2, without a driver performing an operation relating to driving.

As illustrated in FIG. 1, the autonomous driving control system 1 includes an autonomous driving control device 3, an autonomous driving execution device 4, an engine ECU (Electronic Control Unit) 11, a transmission ECU 12, a brake ECU 13, and a steering ECU 14. The respective units are connected to one another to be communicable via a bus 5. Further, an information providing server 6 that will be described later is connected to the autonomous driving control system 1 via a network N including the Internet.

Although details will be described later, the autonomous driving control device 3 controls autonomous driving by transmitting control data to the autonomous driving execution device 4 and controlling the autonomous driving execution device 4.

The autonomous driving execution device 4 executes autonomous driving by transmitting control signals to the respective ECUs based on control data that is inputted from the autonomous driving control device 3 and controlling the respective ECUs.

The engine ECU 11 is connected to a throttle actuator 11a that opens and closes an electronic throttle valve provided in an intake pipe of an engine. The engine ECU 11 controls the throttle actuator 11a based on the control signal received from the autonomous driving execution device 4, and adjusts an opening or closing degree of the electronic throttle valve so that an engine speed becomes a target speed.

The transmission ECU 12 is connected to an oil pressure control device 12a that adjusts oil pressure of an operating oil that is supplied to a transmission. The transmission ECU 12 controls the oil pressure control device 12a based on the control signal received from the autonomous driving execution device 4, adjusts the oil pressure of the operating oil that is supplied to the transmission, switches a transmission ratio of the transmission, and changes the engine speed and torque that are transmitted from the engine.

The brake ECU 13 is connected to a brake device 13a. The brake ECU 13 controls brake devices 13a that are provided at respective wheels of the vehicle 2 based on the control signal received from the autonomous driving execution device 4, and performs braking of the vehicle 2.

The steering ECU 14 is connected to a steering device 14a. The steering ECU 14 controls the steering device 14a provided in the vehicle 2 based on the control signal received from the autonomous driving execution device 4, and performs steering of the vehicle 2.

The autonomous driving execution device 4 controls the respective ECUs based on the control data received from the autonomous driving control device 3, and executes autonomous driving by performing a control of starting/stopping of the vehicle 2, a control of acceleration and deceleration of the vehicle 2, a control of transmission of the vehicle 2, a control of steering of the vehicle 2 and other controls.

Figure 2:
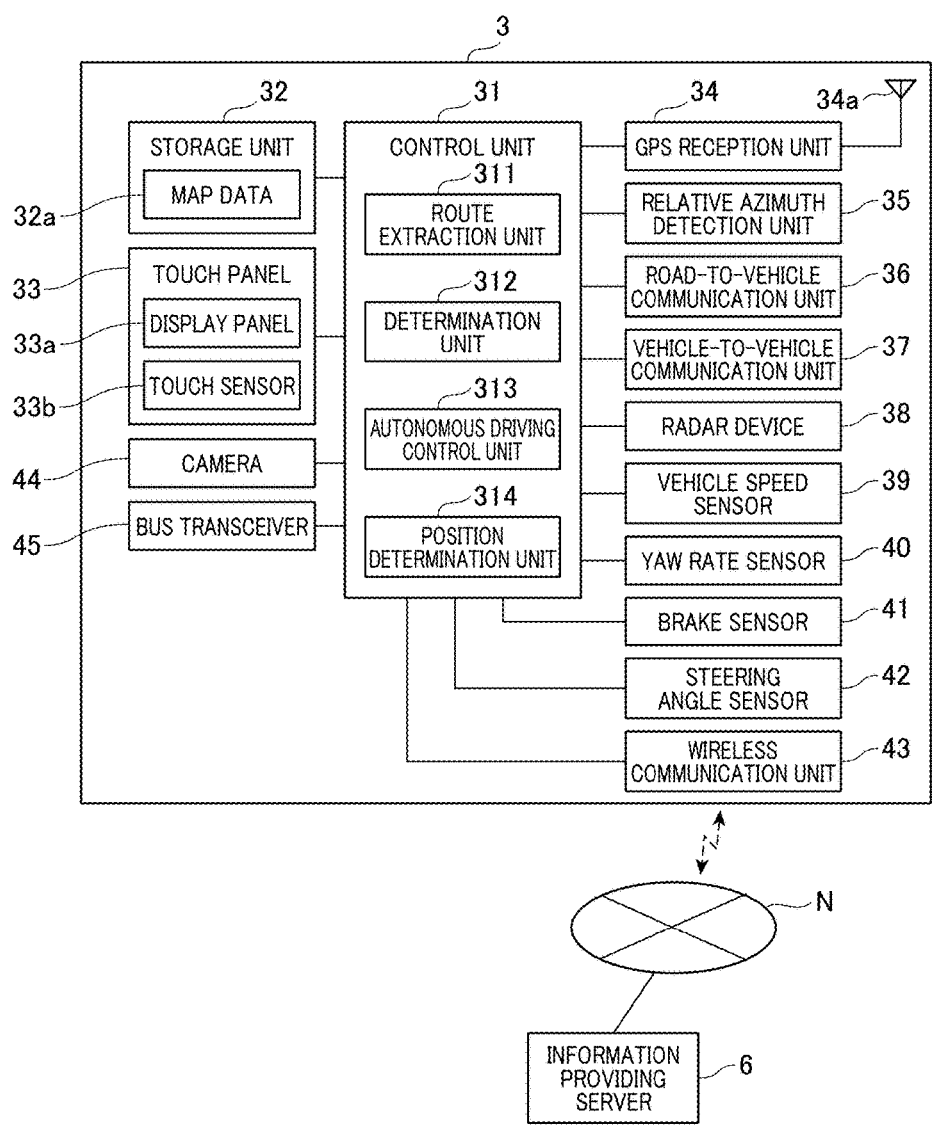
FIG. 2 is a functional block diagram of the autonomous driving control device.

FIG. 2 is a functional block diagram of the autonomous driving control device 3.

As illustrated in FIG. 2, the autonomous driving control device 3 includes a control unit 31, a storage unit 32, a touch panel 33, a GPS reception unit 34, a relative azimuth detection unit 35, a road-to-vehicle communication unit 36, a vehicle-to-vehicle communication unit 37, a radar device 38, a vehicle speed sensor 39, a yaw rate sensor 40, a brake sensor 41, a steering angle sensor 42, a wireless communication unit 43, a camera 44, and a bus transceiver 45.

The control unit 31 includes a CPU, a ROM, a RAM, other control circuits and the like, and controls the respective units of the autonomous driving control device 3. Further, the control unit 31 functions as a route extraction unit 311, a determination unit 312, an autonomous driving control unit 313 and a position determination unit 314 that will be describe later by executing a control program stored in a ROM section or the like.

The storage unit 32 includes a hard disk, and a nonvolatile memory such as EEPROM, and stores data to be rewritable. The storage unit 32 stores map data 32a (map information) other than the control program. The map data 32a has information concerning nodes representing intersections and other connection points on road networks, information concerning links representing road sections between the nodes and nodes, and information concerning administrative divisions on the map, and names of roads, facilities, intersections and the like.

The touch panel 33 includes a display panel 33a and a touch sensor 33b. The display panel 33a is configured by a liquid crystal display and an EL (Electro luminescent) display or the like, and displays various kinds of information on the display panel 33a under control of the control unit 31. The touch sensor 33b is disposed by being laid on the display panel 33a, detects a touch operation of a user, and outputs the touch operation to the control unit 31.

The GPS reception unit 34 receives a GPS radio wave from a GPS satellite via a GPS antenna 34a, and acquires position coordinates indicating a present position of the vehicle 2 and a traveling direction by arithmetic operation from a GPS signal superposed in the GPS radio wave. The GPS reception unit 34 outputs the acquired result to the control unit 31.

The relative azimuth detection unit 35 includes a gyro sensor and an acceleration sensor. The gyro sensor is configured by a vibration gyro, for example, and detects a relative azimuth (a rotation quantity in a yawing axis direction, for example) of an own vehicle. The acceleration sensor detects an acceleration (an inclination of the own vehicle relative to the traveling direction, for example) that acts on the own vehicle. The relative azimuth detection unit 35 outputs a detection result to the control unit 31.

The road-to-vehicle communication unit 36 receives information that is transmitted by narrow band wireless communication such as an optical beacon, a radio wave beacon, and DSRC (Dedicated Short Range Communications) from road side machines installed at road sides in intersections or the like. The information transmitted from the road side machines to the road-to-vehicle communication unit 36 includes road information including, for example, traffic jam information and the like, information on pedestrians, and the like. The road-to-vehicle communication unit 36 outputs received information to the control unit 31.

The vehicle-to-vehicle communication unit 37 mutually transmits vehicle information by wireless communication to surrounding vehicles that are located around the vehicle 2. The vehicle information includes, for example, identification information for identifying the vehicle 2 and the surrounding vehicles, positional information of the vehicle 2 and the surrounding vehicles, and information on speeds of the vehicle 2 and the surrounding vehicles, information on traveling directions of the vehicle 2 and the surrounding vehicles and the like. The vehicle-to-vehicle communication unit 37 outputs the received vehicle information to the control unit 31.

The radar device 38 irradiates a predetermined range ahead of the own vehicle with, for example, a radio wave of a millimeter-wave radar, a laser radar or the like, or a sound wave of an ultrasonic radar or the like. The radar device 38 receives a reflection wave that is reflected by a physical object (a preceding vehicle, for example) that is present in the predetermined range, and thereby detects information of the physical objet traveling ahead of the vehicle 2. The information detected here includes, for example, information on presence or absence of a preceding vehicle, and information on a distance to the preceding vehicle (a following distance), an angle (a relative position), a speed (a relative speed), an acceleration and the like. The radar device 38 outputs the detected information to the control unit 31.

The vehicle speed sensor 39 detects a vehicle speed of the vehicle 2, and outputs a detection signal expressing the detected vehicle speed to the control unit 31.

The yaw rate sensor 40 detects a yaw rate exerted on the vehicle 2, and outputs a detection signal expressing the detected yaw rate to the control unit 31.

The brake sensor 41 detects an operation amount (a depressing amount, an angle, a pressure and the like) of a driver to a brake pedal, and outputs a detection signal expressing the detected operation amount to the control unit 31.

The steering angle sensor 42 detects a steering angle of a steering, and outputs a detection signal expressing the detected steering angle to the control unit 31.

The wireless communication unit 43 makes an access to the network N in conformity with predetermined communication standards by control of the control unit 31, and communicates with external equipment (including the information providing server 6) that is connected to the network N.

The camera 44 includes a plurality of photographing devices, and photographs a front, rear, left and right directions of the vehicle 2. The camera 44 executes photographing at predetermined periods (for example, every 100 ms), generates photographed image data based on the photographing result, and outputs the photographed image data to the control unit 31, in accordance with control of the control unit 31.

The bus transceiver 45 is connected to the bus 5. The bus transceiver 45 is an IC (Integrated Circuit) for interface between buses 5. The bus transceiver 45 transmits control data generated by the autonomous driving control unit 313 of the control unit 31 that will be described later via the bus 5, and receives data transmitted from the other ECUs via the bus 5, and outputs the data to the control unit 31.

Next, the position determination unit 314 and the autonomous driving control unit 313 which are included by the control unit 31 of the autonomous driving control device 3 will be described.

First, the position determination unit 314 will be described.

The position determination unit 314 determines the present position of the vehicle 2, based on the information indicating the position coordinates and the traveling direction which are inputted from the GPS reception unit 34, the relative azimuth information of the vehicle 2, which is inputted from the relative azimuth detection unit 35, the information included in the map data 32a stored in the storage unit 32, the detection signal indicating the vehicle speed, which is inputted from the vehicle speed sensor 39, the detection signal expressing the steering angle, which is inputted from the steering angle sensor 42, the detection signal expressing the operation amount of the brake, which is inputted from the brake sensor 41, and the detection signal expressing the yaw rate, which is inputted from the yaw rate sensor 40. For example, the position determination unit 314 estimates a moving speed, a moving direction and the like of the vehicle 2, at any time, based on the information that is inputted from various sensors such as the relative azimuth detection unit 35 and the like, and the information included in the map data 32a, corrects the present position of the vehicle 2, which is calculated based on the input from the GPS reception unit 34, based on the moving speed, the moving direction and the like which are estimated, and determines the present position. Note that the position determination unit 314 may be configured to determine the present position of the vehicle 2 by using a signal of a positioning satellite system such as GLONASS, Galileo, Beidou and QZSS (MICHIBIKI) in combination with a GPS signal.

Next, the autonomous driving control unit 313 will be described.

The autonomous driving control unit 313 generates control data and outputs the control data to the autonomous driving execution device 4, and causes the autonomous driving execution device 4 to execute autonomous driving, while the vehicle traveling on a route set in advance (hereinafter referred to as "an autonomous driving route") by autonomous driving. The control data includes control information concerning control of autonomous traveling of the vehicle 2 such as control information concerning control of starting/stopping of the vehicle 2, control information concerning control of acceleration and deceleration of the vehicle 2, control information concerning control of transmission of the vehicle 2, and control information concerning control of steering of the vehicle 2.

The autonomous driving control unit 313 generates a target traveling pattern at a time of traveling on an autonomous driving route, and a target speed pattern, while traveling on the autonomous driving route. Next, the autonomous driving control unit 313 generates control data for controlling autonomous driving so that the vehicle 2 travels in accordance with the target traveling pattern and the target speed pattern that are generated. That is, the autonomous driving control unit 313 generates control data including control information that starts/stops and steers the vehicle 2 so that the vehicle 2 travels in accordance with the target traveling pattern, and causes the vehicle 2 to accelerate and decelerate, and change speed so as to realize a speed according to the target speed pattern.

The autonomous driving control unit 313 performs processing as follows while traveling on the autonomous driving route by autonomous driving.

The autonomous driving control unit 313 detects a traveling state of the vehicle 2 based on the inputs from the vehicle speed sensor 39, the steering angle sensor 42, the brake sensor 41 and the yaw rate sensor 40, and corrects the target traveling pattern and the target speed pattern in accordance with the traveling state of the vehicle 2. Further, the autonomous driving control unit 313 corrects the target traveling pattern and the target speed pattern in accordance with a relation with vehicles that are located around the vehicle 2, based on the vehicle information which is inputted from the vehicle-to-vehicle communication unit 37. Further, the autonomous driving control unit 313 acquires information concerning an ambient environment of the vehicle 2 such as presence or absence of a traffic jam, states of signals, and presence or absence of a pedestrian, based on the information inputted from the road-to-vehicle communication unit 36, and the photographed image data inputted from the camera 44, and corrects the target traveling pattern and the target speed pattern in accordance with the ambient environment of the vehicle 2. Further, the autonomous driving control unit 313 corrects the target travelling pattern and the target speed pattern in accordance with the relation with a preceding vehicle based on the information inputted from the radar device 38. Subsequently, the autonomous driving control unit 313 generates control data based on the target traveling pattern and the target speed pattern after correction.

The autonomous driving control unit 313 outputs the generated control data to the autonomous driving execution device 4. The autonomous driving execution device 4 controls the respective ECUs such as the engine ECU 110 based on the inputted control data. As a result, the vehicle 2 autonomously travels in accordance with the target traveling pattern and the target speed pattern which are properly corrected, and traveling on the autonomous driving route by autonomous driving is realized.

Under the configuration as above, the autonomous driving control system 1 according to the present embodiment searches for a route to the destination inputted by the user, and causes the vehicle 2 on the route which is searched for by autonomous driving. Here, on traveling on the route to the destination, which is searched for, by autonomous driving, there arises the following problem in the case of traveling by autonomous driving, as compared with a case where the vehicle 2 travels by driving by the user.

That is, when the autonomous driving control system 1 causes the vehicle 2 to make a right or left turn in an intersection during autonomous driving, the autonomous driving control system 1 executes a right or left turn only when it is determined as safe in consideration of the ambient environment of the vehicle 2, the relation with the other vehicles including the preceding vehicle and the like, based on the information that is inputted from the vehicle-to-vehicle communication unit 37, the road-to-vehicle communication unit 36, the camera 44 and the radar device 38. Accordingly, when a right or left turn is made in one intersection on the route searched for, there can arise the situation where a right or left turn cannot be made in the one intersection, or making a right or left turn is not appropriate, from the ambient environment of the vehicle 2, and the relation with the other vehicles including the preceding vehicle. Based on the above, the autonomous driving control system 1 according to the present embodiment executes proper traveling based on characteristics of autonomous driving, in traveling of the vehicle 2 by autonomous driving to the destination. Hereinafter, an operation of the autonomous driving control device 3 at the time of causing the vehicle 2 to travel to a destination by autonomous driving will be described in detail.

Figure 3:
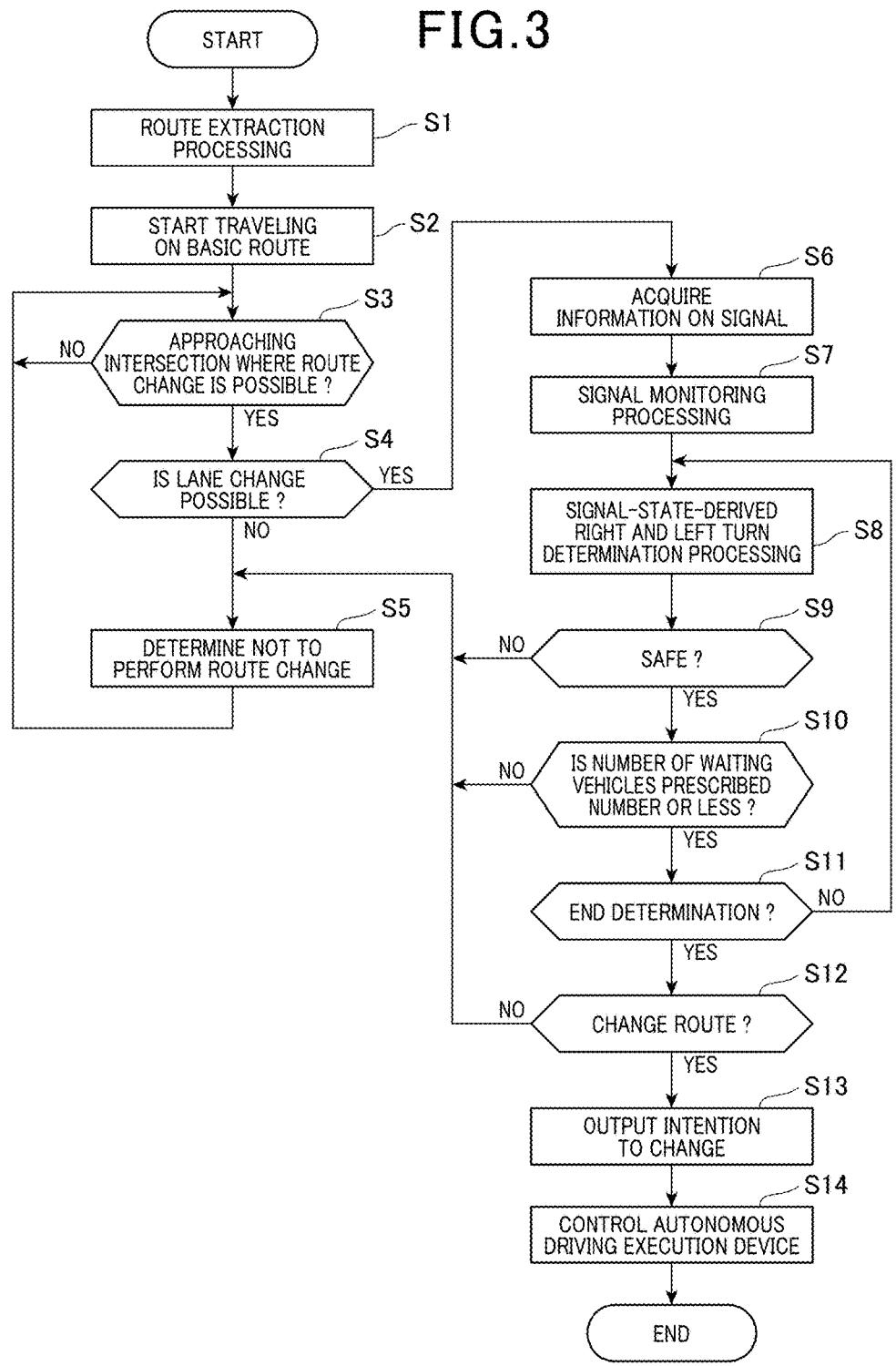
FIG. 3 is a flowchart illustrating an operation of the autonomous driving control device.

FIG. 3 is a flowchart illustrating the operation of the autonomous driving control device 3 at the time of causing the vehicle 2 to travel to the destination by autonomous driving.

As illustrated in FIG. 3, the route extraction unit 311 of the control unit 31 executes route extraction processing (step S1). Hereinafter, the route extraction processing will be described in detail. Note that in the following explanation, an origin is assumed to be the present position of the vehicle 2.

In the route extraction processing, the route extraction unit 311 provides a user interface to which a destination can be inputted.

When the destination is inputted to the user interface, the route extraction unit 311 searches for a plurality of routes to the destination from the origin. Describing in detail, the route extraction unit 311 searches for a route with the smallest link cost among the routes from the origin to the destination, as a basic route R.

Further, the route extraction unit 311 searches for one or a plurality of candidate routes K. The candidate route K is a route that satisfies two conditions as follows. A first condition is that a difference between an arrival time at the destination in a case of traveling on the basic route R, and an arrival time at the destination in a case of traveling on the candidate route K is below a predetermined threshold value. A second condition is that the candidate route K is the route that reaches the destination by making a right or left turn in an intersection having right and left turn exclusive lanes, after traveling on at least a part of the basic route R. The first condition may be that a difference between a traveling distance in the case of traveling on the basic route R and a traveling distance in a case of traveling on the candidate route K is below a predetermined threshold value, in place of the aforementioned condition. Further, as for the second condition, the route may be the candidate route K if there is no right and left turn exclusive lanes. The extraction conditions of the candidate route K can be set arbitrarily, and for example, when importance is attached to safety, a setting with only routes having left and right turn lighting signals that lights arrows of right and left turns as a target may be performed.

Since the candidate route K that satisfies the aforementioned first condition is searched for, there is not a large difference between the time of arrival at the destination by traveling on the basic route R and the time of arrival at the destination by traveling on the candidate route K, and even in the case of arriving at the destination by traveling on the candidate route K, no stress is given to the user.

Further, the autonomous driving has a characteristic that in the case of making a right and left turns in the intersection having right and left turn exclusive lanes, a right and left turns are highly likely to be performed smoothly as compared with the case of making a right and left turns in the intersection that does not have right and left turn exclusive lanes. The reason is as follows. That is, in the case of the intersection having right and left turn exclusive lanes, traffic lanes on which vehicles traveling straight forward and vehicles making a right and left turns travel are different in the vicinity of the intersection, and in the case of a right turn, there is a time period in which only a right turn is performed is present. Due to the circumstances like this, in the processing of determining whether or not a right and left turns can be performed safely in consideration of the ambient environment of the vehicle 2, the relation with the other vehicles including the preceding vehicle and the like, based on the information inputted from the camera 44 and the radar device 38, there is a high possibility of the right and left turns being performed safely. Since the candidate route K that satisfies the aforementioned second condition is searched for at the time of searching for the candidate route K, the route that can reach the destination by performing a smooth right and left turns can be searched for as the candidate route K after travelling on at least a part of the basic route R.

Figure 4:
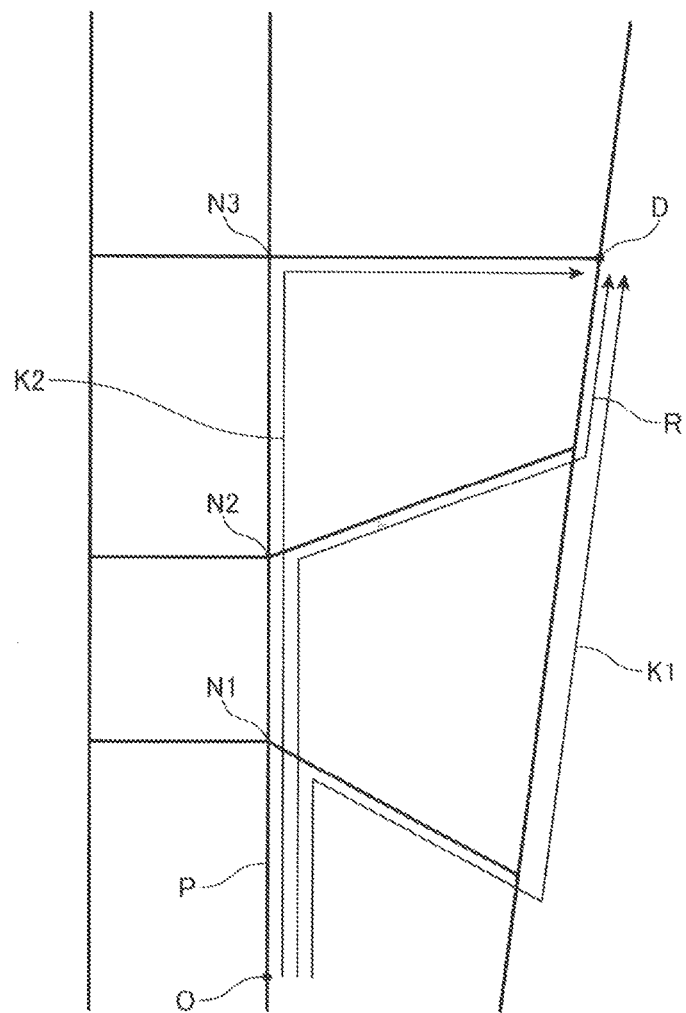
FIG. 4 is a diagram illustrating examples of a route from an origin to a destination.

FIG. 4 is a diagram schematically illustrating the basic route R, and examples of the candidate route K on a map. In FIG. 4, as the candidate route K, two routes that are a candidate route K1 and a candidate route K2 are illustrated.

In FIG. 4, reference sign O denotes an origin, and reference sign D denotes a destination. A road P is present on the map illustrated in FIG. 4, and three intersections that are intersections N1 to N3 are present on the road P. The intersections N1 to N3 are respectively intersections having right and left turn exclusive lanes.

As illustrated in FIG. 4, the basic route R is a route that extends straight forward the intersection N1 from the origin O to reach the intersection N2, and makes a right turn in the intersection N2 to reach the destination D. In the route extraction processing in step S1, the route extraction unit 311 searches for the route with the smallest link cost as the basic route R.

The candidate route K1 is a route that extends from the origin O, and makes a right turn in the intersection N1 to reach the destination D. In the route extraction processing in step S1, the route extraction unit 311 searches for the candidate route K1 that satisfies the aforementioned two conditions in the relation with the basic route R.

The candidate route K2 is a route that extends from the origin O, and makes a right turn in the intersection N3 to reach the destination D. In the route extraction processing in step S1, the route extraction unit 311 searches for the candidate route K2 that satisfies the aforementioned two conditions in the relation with the basic route R.

Note that the map data 32a has link costs of the respective links and division estimated travel time periods, and the route extraction unit 311 searches for the candidate routes K based on the map data 32a.

In the route extraction processing, after searching for the basic route R and one or a plurality of candidate routes K, the route extraction unit 311 acquires candidate route information J1 of each of the candidate routes K which are searched for, and intersection information J2 of each of the intersections which are present on the respective routes searched for, and in which a right and left turns are performed.

FIG. 5A is a diagram illustrating an example of the candidate route information J1. In FIG. 5A, as the candidate route information J1, candidate route information J1*a* of the candidate route K1 illustrated in FIG. 4, and candidate route information J1*b* of the candidate route K2 are illustrated.

The candidate route information J1 is information concerning the candidate route K, and has estimated travel time period difference information J11 that indicates a difference between an estimated travel time period of the basic route R, and an estimated travel time period of the candidate route K. The estimated travel time period difference information J11 of the candidate route information J1*a* relating to the candidate route K1 in FIG. 5A indicates that the difference in estimated travel time period is 60 seconds. Further, the candidate route information J1*a* has distance difference information J12 that indicates a difference between a distance of the basic route R and a distance of the candidate route K. The distance difference information J12 of the candidate route information J1*a* relating to the candidate route K1 in FIG. 5A indicates that the difference in distance is 100 m.

FIG. 5B is a diagram illustrating one example of the intersection information J2. FIG. 5B illustrates the intersection information J2 of the intersection N1 illustrated in FIG. 4, as the intersection information J2.

The intersection information J2 is information concerning the intersection which is on the basic route R and the candidate route K and is the intersection in which a right and left turns are performed. In the route extraction processing, the route extraction unit 311 acquires the intersection information J2 for each of the corresponding intersections.

The intersection information J2 has straight-forward traveling time route information J201. The straight-forward traveling time route information J201 is information indicating a route on which the vehicle 2 travels when traveling straight forward in the intersection, and indicates any one of the basic route R, the candidate route K, and a non-route that indicates neither the basic route R nor the candidate route K. In an example in FIG. 5B, the vehicle 2 travels on the basic route R when traveling straight forward in the intersection N1, and therefore, the straight-forward traveling time route information J201 indicates the basic route R.

Further, the intersection information J2 has right-turn time route information J202. The right-turn time route information J202 is information indicating a route on which the vehicle 2 travels when making a right turn in the intersection, and indicates any one of the basic route R, the candidate route K and the non-route. In the example in FIG. 2B, the vehicle 2 travels on the candidate route K1 when making a right-turn in the intersection N1, and therefore, the right-turn time route information J202 indicates the candidate route K1.

Further, the intersection information J2 has left-turn time route information J203. The left-turn time route information J203 is information indicating the route on which the vehicle 2 travels when making a left-turn in the intersection, and indicates any one of the basic route R, the candidate route K and the non-route. In the example in FIG. 2B, the vehicle 2 travels on the non-route when making a left turn in the intersection N1, and therefore, the left-turn time route information J203 indicates the non-route.

Further, the intersection information J2 has right-turn difficulty degree information J204. The right-turn difficulty degree information J204 is information indicating a degree of difficulty at a time of making a right turn in an intersection. In the present embodiment, the right-turn difficulty degree information J204 is numeric values of "1" to "10", and as the degree of difficulty is larger, a value thereof is larger.

Further, the intersection information J2 has accident occurrence probability information J205. The accident occurrence probability information J205 is information indicating a degree of probability of occurrence of an accident in an intersection. In the present embodiment, the accident occurrence probability information J205 is numeric values of "1" to "10", and as the degree of the accident occurrence probability information J205 is larger, the value thereof is larger.

Further, the intersection information J2 has exclusive lane presence or absence information J206. The exclusive lane presence or absence information J206 is information indicating whether or not an intersection has right and left turn exclusive lanes.

Further, the intersection information J2 has right-turn signal presence or absence information J207. The right-turn signal presence or absence information J207 is information indicating whether or not an intersection has a signal indicator exclusively for a right turn.

Further, the intersection information J2 has white line maintenance situation information J208. The white line maintenance situation information J208 is information indicating whether or not maintenance of white lines according to a predetermined law is completed in an intersection.

Further, the intersection information J2 has signal installation position information J209. The signal installation position information J209 is information indicating a position where a signal is installed in an intersection.

Further, the intersection information J2 has a blue signal lighting-up time period information J210. The blue signal lighting-up time period information J210 is information indicating a time period in which a blue signal of the signal in an intersection lights up.

Further, the intersection information J2 has red signal lighting-up time period information J211. The red signal lighting-up time period information J211 is information indicating a time period in which a red signal of the signal in an intersection lights up.

Further, the intersection information J2 has a pedestrian signal waiting time period display presence or absence information J212. The pedestrian signal waiting time period display presence or absence information J212 is information indicating whether or not to perform display expressing a time period until a pedestrian signal changes to a blue signal next, and display expressing a time period until the pedestrian signal changes to a red signal next, when the pedestrian signal is provided in an intersection.

In the route extraction processing, the route extraction unit 311 acquires the intersection information J2 in the following manner. That is, the route extraction unit 311 controls the wireless communication unit 43, communicates with the information providing server 6, and transmits intersection information request data to the information providing server 6. The intersection information request data is control data that requests transmission of the intersection information, and includes information indicating the basic route R which is searched for, and information indicating the candidate route K. The information indicating the basic route R and the information indicating the candidate route K include information necessary for the information providing server 6 to determine the basic route R and the candidate route K, such as information indicating links configuring the respective routes.

Here, the information providing server 6 stores a database storing information concerning intersections with respect to the intersections on the map. To the intersections on the map, intersection IDs for uniquely identifying the intersections are assigned in advance, and the database is stored with the intersection ID and information concerning the intersections being coordinated with each other, with respect to each of the intersections on the map. The intersection IDs which are common in the autonomous driving control device 3 and the information providing server 6 are used. The information concerning the intersections include at least the right-turn difficulty degree information J204 to the pedestrian signal waiting time period display presence or absence information J212 which are explained in FIG. 5B.

When the information providing server 6 receives the intersection information request data that is transmitted by the route extraction unit 311, the information providing server 6 acquires the information indicating the basic route R included in the data and the information indicating the candidate route K. Next, the information providing server 6 determines the intersection IDs of the intersections that are present on the respective routes, and are intersections in which a right and left turns are performed, based on the information indicating the basic route R and the information indicating the candidate route K, which are acquired. Next, the information providing server 6 refers to the database, and acquires information concerning the intersections which are coordinated with the intersection IDs, with respect to the respective intersections indicated by the intersection IDs which are determined. Next, the information providing server 6 acquires the right-turn difficulty degree information J204 to the pedestrian signal waiting time period display presence or absence information J212, based on the information concerning the intersections which is acquired, with respect to the respective intersections indicated by the intersection IDs which are determined. Next, the information providing server 6 calculates and acquires the straight-forward traveling time route information J201, the right-turn time route information J202 and the left-turn time route information J203, with respect to the respective intersections indicated by the intersection IDs which are determined, based on the information indicating the basic route R and the information indicating the candidate route K.

Next, the information providing server 6 transmits the intersection information J2 (the straight-forward traveling time route information J201 to the pedestrian signal waiting time period display presence or absence information J212 that are acquired by the aforementioned method) to the autonomous driving control device 3, by coordinating the intersection information J2 with the intersection IDs, with respect to the respective intersections indicated by the intersection IDs which are determined.

The route extraction unit 311 of the control unit 31 of the autonomous driving control device 3 controls the wireless communication unit 43, receives the information transmitted by the information providing server 6, and acquires the intersection information J2 based on the received information.

As illustrated in FIG. 3, after execution of the route extraction processing in step S1, the autonomous driving control unit 313 controls autonomous driving so as to travel on the basic route R (step S2). The autonomous driving control unit 313 executes autonomous driving, by generating the target traveling pattern corresponding to the basic route R and the target speed pattern, correcting the target traveling pattern and the target speed pattern at any time by the aforementioned method, generating control data based on the respective patterns that are corrected, transmitting the control data to the autonomous driving execution device 4, and controlling the device.

When traveling by autonomous driving is started, the determination unit 312 refers to the map data 32*a*, and monitors whether or not the separation distance between the present position of the vehicle 2 which is determined by the position determination unit 314 and the intersection where a route change is possible is below the predetermined threshold value (step S3). The intersection where a route change is possible is an intersection where the route in which the vehicle 2 travels can be changed to the candidate route K (when a plurality of candidate routes K are searched for, any one of the candidate routes K) from the basic route R, by making a right or left turn being made in the intersection. In the example of FIG. 4, a route change is possible at the intersection N1, and in step S3, the determination unit 312 monitors whether or not the separation distance between the present position of the vehicle 2 and the intersection N1 is below the predetermined threshold value after the vehicle 2 starts the origin O.

When the determination unit 312 determines that the separation distance is below the predetermined threshold value (step S3: YES), the determination unit 312 executes the following processing (step S3). In the following explanation, the intersection which the vehicle 2 is determined to approach with the separation distance smaller than the predetermined threshold value in step S3 is referred to as "the determination target intersection".

In step S3, the determination unit 312 determines whether or not a lane change of the vehicle 2 is possible based on the information concerning the white lanes of the road (step S4). Note that in the present embodiment, the white line means a line that is formed on the road in accordance with a predetermined law, irrespective of a color thereof.

Describing the processing in step S4 in detail, the determination unit 312 determines whether or not maintenance of the white line pursuant to the predetermined law is completed based on the white line maintenance situation information J208 of the intersection information J2 of the determination target intersection. When maintenance of the white line is not completed, it is determined that lane change of the vehicle 2 is not possible, because it cannot be accurately determined whether lane change using the white line of the road is right or wrong.

Further, when maintenance of the white line is completed, the determination unit 312 determines whether or not lane change of the vehicle 2 is possible, based on the photographed image data that is inputted from the camera 44. Hereinafter, detailed explanation will be made.

Figure 6:
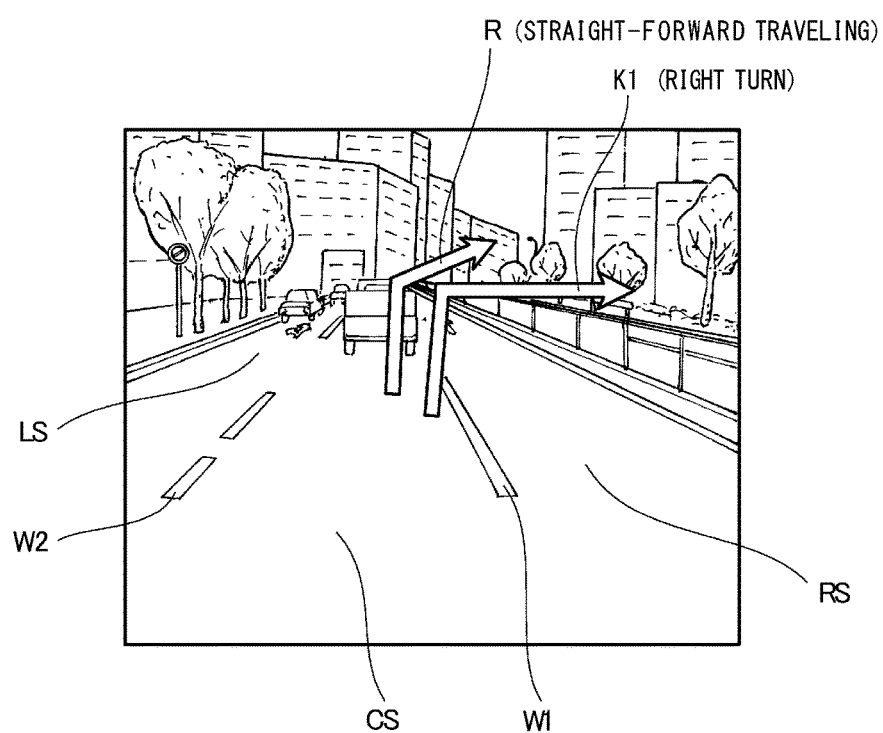
FIG. 6 is a view illustrating an example of a situation of an intersection.

FIG. 6 is a view showing an example of a situation ahead of the vehicle 2 at a time when the vehicle 2 approaches the intersection N1 (refer to FIG. 4) that is the determination target intersection.

In an example in FIG. 6, a road on which the vehicle 2 is traveling has a straight-forward traveling exclusive lane CS, a right-turn exclusive lane RS, and a left-turn exclusive lane LS. Further, the vehicle 2 is traveling on the straight-forward traveling exclusive lane CS. Further, as illustrated in FIG. 4, the vehicle 2 can travel on the basic route R after passing through the intersection N1 by traveling straight forward in the intersection N1. Further, the vehicle 2 performs change of the route to the candidate route K1 by changing the lane to the right-turn exclusive lane RS and making a right turn in the intersection N1, and can travel on the candidate route K1 after passing through the intersection N1.

In the situation illustrated in FIG. 6, the determination unit 312 determines a kind of a white line W1 which is between the straight-forward exclusive lane CS and the right-turn exclusive lane RS based on the photographed image date that is inputted from the camera 44. Here, the white line the kind of which is determined may be only the white line W1. This is because the route in the case of a left turn being made can be determined as a non-route based on the straight-forward traveling route information J201, the right-turn time route information J202 and the left-turn time route information J203 of the intersection information J2 of the intersection N1, and the direction in which the vehicle 2 should travel can be limited to a straight-forward direction, or a right-turn direction. Determination of the kind of the white line is performed by using an existing technique such as pattern matching. After the determination unit 312 determines the kind of the white line, the determination unit 312 determines whether or not the lane change of the vehicle 2 is possible based on the kind of the white line which is determined.

When the lane change of the vehicle 2 is not possible (step S4: NO), the determination unit 312 determines not to perform change of the route from the basic route R to the candidate route K, by performing no right and left turn in the determination target intersection (step S5). Thereafter, the determination unit 312 returns a processing procedure to step S3, and monitors whether or not the separation distance between a next intersection where a route change is possible, and the present position of the vehicle 2 is below the predetermined threshold value again. As above, when the lane change of the vehicle 2 is not possible, a possibility of being unable to make a smooth right or left turn in the determination target intersection is high, and therefore, the determination unit 312 determines not to perform change of the route from the basic route R to the candidate route K.

Note that determination of whether or not the lane change of the vehicle 2 is possible may be performed based on the information of the map data 32a when the map data 32a has the information concerning the vehicle lane.

When lane change of the vehicle 2 is possible (step S4: YES), the determination unit 312 controls the wireless communication unit 43, and acquires a traveling direction determination table F of the signal in the target intersection from the information providing server 6 (step S6).

Figure 7:
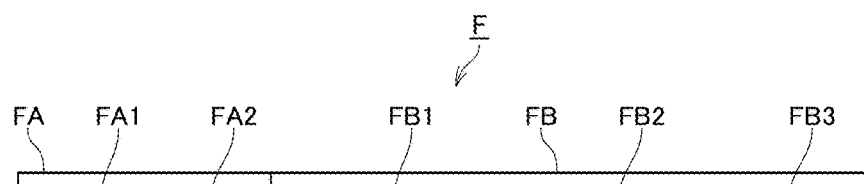
FIG. 7 is a diagram illustrating an example of signal information.

FIG. 7 is a diagram illustrating one example of the traveling direction determination table F.

As illustrated in FIG. 7, the traveling direction determination table F has a signal state field FA, and a traveling direction field FB. The signal state field FA has a previous time signal state field FA1 that stores a signal state of a previous time that stores a signal state of a previous time, and a present signal state field FA2 that stores a present signal state.

The signal state refers to a state of a signal that is displayed by a signal, and is any one of "red", "yellow", "blue" and "an arrow" in the present embodiment. The "arrow" refers to a signal indicating that a right turn is possible. The signal state of the previous time is "blue" that is a signal state before change, when the signal state changes from "blue" to "yellow", and the signal state at a present point of time is "yellow", for example. Further, the present signal state refers to "yellow" that is a signal state after change, when the signal state changes to "yellow" from "blue", and the signal state at the present point of time is "yellow", for example. Note that the signal illustrated here is illustrated as the signal that displays the "arrow" indicating that a right turn is possible, however, the "arrow" is not always a right turn. The "arrow" represents a signal indicating that entry to a specific direction is possible.

In the previous time signal state field FA1, information indicating that the signal state of the previous time is not determined (displayed as "-" in FIG. 7) can be stored.

The traveling direction field FB has a 15 seconds left field FB1, a 10 seconds left field FB2, and a 5 seconds left field FB3 in accordance with time periods (15 seconds, 10 seconds and 5 seconds in the present embodiment) until the vehicle 2 arrives at the determination target intersection, and in the respective fields, the traveling directions that should be selected at a time of passing through the determination target intersection are stored.

A traveling direction that is stored in the 15 seconds left field FB1 of the traveling direction field FB of one record of the traveling direction determination table F means the following. That is, when the signal state of the previous time is the signal state indicated by the information stored in the previous time signal state field FA1 of the one record, and the present signal state is a signal state indicated by the information stored in the present signal state field FA2 of the one record, and when the time period until the vehicle 2 arrives at the determination target intersection is "15 seconds", it is indicated that the vehicle 2 should travel in the traveling direction indicated by the information stored in the 15 seconds left field FB1. The same also applies to the 10 seconds left field FB2 and the 5 seconds left field FB3. For example, when the signal state of the previous time is "yellow", and the signal state of this time is "arrow", a first record R1 of the traveling direction determination table F in FIG. 7 indicates that the vehicle 2 should travel straight forward when the time period until the vehicle 2 arrives at the intersection is "15 seconds", indicates that the vehicle 2 should travel straight forward when the time period until the vehicle 2 arrives at the intersection is "10 seconds", and indicates that the vehicle 2 should make a right turn when the time period until the vehicle 2 arrives at the intersection is "5 seconds".

The respective records of the traveling direction determination table F are created from the following view point. That is, the viewpoint is such that when the vehicle 2 arrives at the determination target intersection, the direction in which the vehicle 2 can smoothly travel in accordance with the signal state at that time is determined as the traveling direction. In particular, when a right turn by an instruction of the signal indicator exclusive to a right turn is possible in the determination target intersection when change of the route is possible by making a right turn in the determination target intersection, the traveling direction of the vehicle 2 is set determined as "a right turn". This is for the following reason. That is, as described above, during traveling by autonomous driving, the autonomous driving control device 3 always monitors the situation and the like around the vehicle 2 based on the inputs from the camera 44 and the like, and causes the vehicle 2 to travel in accordance with the situation and the like around the vehicle 2. When the vehicle 2 makes a right turn in the intersection based on an instruction of the signal indicator exclusive to a right turn, other vehicles that enter the intersection are basically only the vehicles that make a right turn, and therefore, when a right turn is made in the intersection based on the instruction of the signal indicator exclusive to a right turn, the right turn can be performed very smoothly by autonomous driving due to the characteristics of autonomous driving described above, as compared with the case where the right turn is not made based on the instruction of the signal indicator exclusive to a right turn.

Here, when the present signal state is "yellow" at a spot where a time period until arrival at the intersection N1 is 10 seconds in the case where the determination target intersection is the intersection N1, for example, the possibility of the signal state being the "arrow" is high at the time of passing through the intersection N1. In this case, the vehicle 2 can travel to the destination D more smoothly by making a right turn and traveling on the candidate route K1 than waiting until the signal state returns to "blue" again to travel on the basic route R.

In step S6, the determination unit 312 acquires the traveling direction determination table F in the following manner. The determination unit 312 controls the wireless communication unit 43, and transmits determination table transmission request data that includes the intersection ID of the determination target intersection, and requests transmission of the traveling direction determination table F of the intersection indicated by the intersection ID. The information providing server 6 generates the traveling direction determination table F from information concerning the intersection that is stored in correspondence with the intersection ID, and transmits the traveling direction determination table F to the autonomous driving control device 3. The determination unit 312 controls the wireless communication unit 43, and receives and acquires the traveling direction determination table F.

When the determination unit 312 acquires the traveling direction determination table F, the determination unit 312 starts signal monitoring processing (step S7). Describing in detail, the determination unit 312 acquires (monitors the signal state) the signal state of the determination target intersection at predetermined periods (every 0.1 seconds, for example), and determines the signal state of the previous time and the present signal state, based on the acquired result.

Acquisition of the signal state of the determination target intersection is performed as follows, for example. For example, the determination unit 312 analyzes the photographed image data which is inputted from the camera 44, determines the signal state of the photographed signal, and acquires the signal state of the determination target intersection based on the determined result. On an occasion of analysis of the photographed image data, the signal installation position information J209 of the intersection information J2 may be used. Further, for example, the determination unit 312 may acquire the signal information of the determination target intersection, by using the information inputted from the road-to-vehicle communication unit 36 when the road-side machine transmits the information concerning the signal, by using the information inputted from the vehicle-to-vehicle communication unit 37 when the information concerning the signal can be acquired from other vehicles by vehicle-to-vehicle communication, and by using the information acquired by an inquiry to the information providing server 6 when the information providing server 6 manages the information concerning the signal.

FIGS. 8A and 8B are diagrams that are used in explanation of the processing in step S7. As illustrated in FIG. 8A, when the determination unit 312 detects that the present signal state is "blue" after starting the signal monitoring processing in step S7, the determination unit 312 determines that the present signal state is "blue". When the determination unit 312 executes the signal monitoring processing continuously, and detects that the signal state changes from "blue" to "yellow", the determination unit 312 determines that the present signal state is "yellow", and the signal state of the previous time is "blue" as illustrated in FIG. 8B. In this way, in the signal monitoring processing, the determination unit 312 monitors whether or not a change occurs in the signal state of the signal in the determination target intersection, and when a change occurs, the determination unit 312 determines and manages the signal state before the change as the signal state of the previous time, and the signal state after the change as the present signal state.

After start of the signal monitoring processing, the determination unit 312 executes signal-state-derived right and left turn determination processing while executing the signal monitoring processing (step S8). The signal-state-derived right and left turn determination processing is processing of determining a traveling direction at a time of going by way of the determination target intersection. Describing in detail, the determination unit 312 firstly determines whether or not the time period (hereinafter referred to as "an arrival left time period") until the vehicle 2 arrives at the determination target intersection reaches any one of 15 seconds, 10 seconds, and 5 seconds. The determination unit 312 calculates the arrival left time period based on the present position of the vehicle 2, which is determined by the position determination unit 314, the information concerning the links which the map data 32a has, the traveling situation (the vehicle speed and the like) of the vehicle 2 which is grasped from various sensors, the situation around the vehicle 2 based on the information inputted from the camera 44, the road-to-vehicle communication unit 36 and the like, and the like, and performs the above described determination.

When the arrival left time period becomes any one of 15 seconds, 10 seconds, and 5 seconds, the determination unit 312 refers to the traveling direction determination table F, and determines a record in which a combination of the signal information of the previous time and the present signal information which are determined by the signal monitoring processing is stored in the signal state field FA, among the records in the traveling direction determination table F. Next, the determination unit 312 refers to a field (any one of the 15 seconds left field FB1, 10 seconds left field FB2, and 5 seconds left field FB3) corresponding to the arrival left time period (any one of 15 seconds, 10 seconds and 5 seconds) in the determined record, and acquires the traveling direction stored in the corresponding field. The determination unit 312 determines the acquired traveling direction as the traveling direction at the time of going by way of the determination target intersection. The traveling direction determined here is the traveling direction in which the vehicle 2 is assumed to travel smoothly, from the signal state at the time of the vehicle 2 arriving at the determination target intersection.

Note that the right-turn difficulty degree information J204, the accident occurrence probability information J205, the blue signal lighting-up time period information J210, the red signal lighting-up time period information J211 and the pedestrian signal waiting time period display presence or absence information J212 which the intersection information J2 has, may be reflected in the determination of the signal-state-derived right and left turn determination processing.

After determining the traveling direction of the vehicle 2 is determined by the signal-state-derived right and left turn determination processing, the determination unit 312 determines whether or not traveling in the traveling direction of the vehicle 2 which is determined by the signal-state-derived right and left turn determination processing can be performed safely (step S9). The determination unit 312 performs determination of whether or not safe traveling is possible by reflecting the situation around the vehicle 2 and the like based on the inputs from the camera 44, the vehicle-to-vehicle communication unit 37, the road-to-vehicle communication unit 36, the radar device 38 and the like. For example, in a case of performing a right turn involving a lane change to the right turn exclusive lane RS, the determination unit 312 performs determination of whether or not safe traveling is possible based on presence or absence of a following car that travels on the right-turn exclusive lane RS, and the like.

When traveling cannot be performed safely (step S9: NO), the determination unit 312 determines not to perform change of the route from the basic route R to the candidate route K by performing no right or left turn in the determination target intersection (step S5), and returns the processing procedure to step S3. In this way, the determination unit 312 determines not to perform change of the route from the basic route R to the candidate route K, when the right and left turns cannot be performed safely.

When traveling can be performed safely (step S9: YES), the determination unit 312 determines whether or not a number of vehicles that wait for a right and left turns in the right and left turn exclusive lanes is a prescribed value or less when performing lane change to the right or left turn exclusive lane, in order to travel in the traveling direction which is determined by the signal-state-derived right and left turn determination processing. The determination unit 312 acquires the number of vehicles that wait for a right and left turns in the right and left turn exclusive lanes based on the inputs from the camera 44, the road-to-vehicle communication unit 36, the vehicle-to-vehicle communication unit 37 and the like.

When the number of vehicles waiting for a right and left turns is not the prescribed value or less (step S12: NO), the determination unit 312 determines not to perform change of the route from the basic route R to the candidate route K by performing no right or left turn in the determination target intersection (step S5), because a right or left turn cannot be performed smoothly, and returns the processing procedure to step S3.

When the number of vehicles that wait for a right and left turns is the prescribed value or less (step S10: YES), the determination unit 312 determines whether or not to finish the signal-state-derived right and left turn determination processing (step S11). In step S11, when the signal-state-derived right and left turn determination processing in the case of the arrival left time period being 15 seconds, in the case of 10 seconds and in the case of 5 seconds is completed, the determination unit 312 determines to end the processing, and when the signal-state-derived right and left turn determination processing is not completed, the determination unit 312 determines not to end the processing.

When the determination unit 312 does not end the processing (step S11: NO), the determination unit 312 returns the processing procedure to step S8.

When the determination unit 312 ends the processing (step S11: YES), the determination unit 312 determines whether or not change of the route from the basic route R to the candidate route K is performed when traveling in the traveling direction which is determined in the signal-state-derived right and left turn determination processing (step S12). When change of the route is not performed (step S12: NO), the determination unit 312 returns the processing procedure to step 3. In this case, traveling on the basic route R by autonomous driving is continuously performed.

When change of the route is performed, the determination unit 312 outputs an intention to change the route to the candidate route K to the autonomous driving control unit 313 (step A13).

The autonomous driving control unit 313 changes the route on which the vehicle 2 travels from the basic route R to the candidate route K, corrects the target traveling pattern, and the target speed pattern so that the vehicle 2 travels on the candidate route K after change, generates control data based on the respective patterns after correction, and transmits the control data to the autonomous driving execution device 4 to control the device (step S14). Thereby, the vehicle 2 makes a right or left turn in the determination target intersection, travels on the candidate route K by autonomous driving and arrives at the destination D.

Note that although the case where the aforementioned determination unit 312 monitors the state of the signal is illustrated, the determination unit 312 may monitor a road sign without being limited to a signal.

For example, when the road sign "Right turn permissible at any time" is present with a signal in the intersection N1, the determination unit 312 monitors both of the signal and the road sign. In this case, determination of a right turn can be performed because the road sign is monitored by the determination unit 312 even when the signal state is "red". Consequently, the vehicle 2 is capable of more flexible autonomous driving, and stress about waiting for a signal can be especially reduced.

Figure 9:
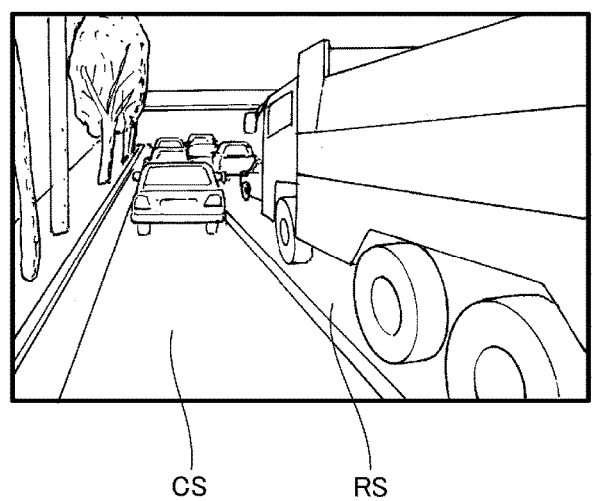
FIG. 9 is a view illustrating an example of a situation of an intersection.

Further, although the case of changing to the candidate route K1 from the basic route R is described above by illustrating the intersection N1, the control unit 31 executes the following processing even in a situation of an intersection as in FIG. 9.

FIG. 9 is a view illustrating one example of the situation of the intersection, and particularly illustrates a situation of an intersection N2 in FIG. 4.

As illustrated in FIG. 9, the intersection N2 has a straightforward traveling exclusive lane CS, and a right-turn exclusive lane RS. By traveling straight forward in the intersection N2, the vehicle 2 can travel in the candidate route K2, and by making a right turn in the intersection N2, the vehicle 2 can travel on the basic lane R.

As illustrated in FIG. 9, there are many vehicles waiting for a right turn in the right-turn exclusive lane RS, and therefore it is not right to change the lane to the right-turn exclusive lane RS to travel on the basic route R. In this case, the determination unit 312 determines whether or not the number of vehicles waiting for a right and left turns is a prescribed value or more in step S10. The determination unit 312 determines that the intersection N2 is an intersection where a turn is difficult to make due to a large number of vehicles (step S10: YES), and determines to travel straight forward without making a right turn in the intersection N2. That is, it is determined to travel on the candidate route K2 without traveling on the basic route R after passing through the intersection N2. In this way, the determination unit 312 can determine the route after passing through the intersection N2 to be the candidate route K2 in accordance with the situation of the intersection, although the basic route R is recommended, and therefore the vehicle 2 is capable of flexible autonomous driving.

As explained above, the autonomous driving control device 3 is the autonomous driving control device 3 that is mounted on the vehicle 2 and controls autonomous driving, and includes the storage unit 32 that stores the map data 32a (the map information), the route extraction unit 311 that extracts a plurality of routes from the origin to the destination based on the map data 32a, the determination unit 312 that determines whether or not to change to the candidate route K in accordance with the situation of an intersection when the vehicle 2 approaches the intersection while the vehicle 2 is traveling on the basic route R of the routes extracted by the route extraction unit 311, and the autonomous driving control unit 313 that controls autonomous driving based on determination of the determination unit 312.

By the configuration, the autonomous driving control device 3 can control autonomous driving so as to perform change of the route corresponding to the situation of the intersection by the autonomous driving control unit 313. Consequently, the vehicle 2 can perform route change corresponding to the situation of the intersection during traveling, and autonomous driving corresponding to the characteristic of the autonomous driving is enabled. Further, since the vehicle 2 can perform route change corresponding to the situation of the intersection, stress of a user about waiting for a signal and the like can be reduced.

Further, the route extraction unit 311 of the autonomous driving control device 3 in the present embodiment extracts a plurality of routes with differences in an estimated travel time period being in a predetermined range.

By the configuration, the route extraction unit 311 can extract a plurality of routes without a large difference in the estimated travel time period. Consequently, when a route change from the basic route R to the candidate route K takes place, there is no difference between the arrival time at the time of arriving at the destination by traveling on the basic route R, and the arrival time at the time of arriving at the destination by traveling on the candidate route K, and even when the route is changed to the candidate route K, the user does not feel stress.

Further, the determination unit 312 of the autonomous driving control device 3 in the present embodiment determines whether or not to change to the candidate route K from the basic route R in accordance with the signal state of an intersection.

By the configuration, the determination unit 312 can determine to perform route change when a right or left turn can be smoothly made in the intersection in accordance with the state of the signal which is present in the intersection.

Further, the determination unit 312 of the autonomous driving control device 3 in the present embodiment determines to perform change to the candidate route K from the basic route R by making a right turn in an intersection, when the signal in the intersection at the time of the vehicle 2 arriving at the intersection indicates a right turn when change to the candidate route K from the basic route R is performed by making a right turn in the intersection.

Here, as described above, autonomous driving has the characteristic that a right turn is more highly likely to be performed smoothly in the case where the right turn is made in response to the instruction to make a right turn, as compared with the case where the right turn is not made in response to the instruction to make a right turn, on the occasion of a right turn in the intersection. By the above described configuration, the determination unit 312 can determine whether or not to perform route change based on the aforementioned characteristic.

Further, the determination unit 312 of the autonomous driving control device 3 in the present embodiment determines whether or not change of a lane is possible when the change of the lane is necessary to make a right or left turn when change to the candidate route K from the basic route R is performed by making a right or left turn in the intersection, and determines not to perform the change of the route when the change of the lane is not possible.

By the above configuration, the determination unit 312 performs determination of route change based on whether or not change of a lane is possible, and therefore the vehicle 2 is capable of safe autonomous driving.

Further, the determination unit 312 of the autonomous driving control device 3 in the present embodiment acquires information concerning the white line formed in on the road, and determines whether or not change of a lane is possible based on the acquired information.

By the above configuration, the determination unit 312 can perform determination of whether or not lane change is possible by using the white line.

The aforementioned embodiment only illustrates one aspect of the present invention, and modifications and applications can be arbitrarily made within the range without departing from the gist of the present invention.

For example, in the aforementioned embodiment, the case of executing extraction of the basic route R and the candidate route K by the route extraction unit 311 included by the control unit 31 is illustrated, but the information providing server 6 may execute extraction of the route without being limited to the case. In this case, the autonomous driving control device 3 transmits the origin O and the destination D to the information providing server 6 via the wireless communication unit 43 with a setting of the destination D as a trigger. The information providing server 6 executes extraction of the basic route R and the candidate route K based on the origin O and the target D which are received. The basic route R and the candidate route K which are extracted are transmitted to the autonomous driving control device 3. Thereby, the vehicle 2 can perform autonomous driving based on the basic route R and the candidate route K which are more accurate.

Further, for example, in the aforementioned embodiment, the basic route R is illustrated as the route with the lowest link cost among the routes that can be extracted from the origin O and the destination D which are set, but the basic route R is not limited to this, and may be a route with the shortest arrival time period, or may be a route based on an actual traveling history of a user such as probe data and statistical data.

Further, for example, the aforementioned embodiment illustrates that determination is performed based on the monitoring result of the determination unit 312 every arrival left time period to the intersection. However, determination may be performed by acquiring the waiting time for the signal by the road-to-vehicle communication unit 36 or the like. In this case, the accurate waiting time for the signal can be found, and therefore, the determination unit 312 enables more accurate determination.

Further, for example, the aforementioned embodiment illustrates the case where the determination unit 312 determines that the signal state is any one of "blue", "yellow", "red" and an "arrow", and determines the traveling direction of the vehicle 2, but the present invention is not limited to this, and may adopts the configuration of determining a "flashing yellow", a "flashing red" or a "yellow arrow", and determining the traveling direction of the vehicle 2.

Further, for example, the information providing server 6 in the aforementioned embodiment has the information concerning intersections, and is configured to generate the intersection information J2 and the traveling direction determination table F in response to the inquiry from the autonomous driving control device 3, and transmit the intersection information J2 and the traveling direction determination table F to the autonomous driving control device 3. However, the present invention is not limited to this, but the information concerning the intersections may be included in the map data 32a, and the autonomous driving control device 3 may generate the intersection information J2 and the traveling direction determination table F based on the information concerning the intersections included in the map data 32a.

Further, the aforementioned embodiment illustrates the case where change of the route is performed by autonomous driving by the autonomous driving control system 1. That is, the autonomous driving is complete autonomous driving capable of autonomous traveling of the vehicle 2 without a driver performing an operation concerning driving at all. However, processing of change of a route may be also performed in the case of manual driving without being limited to completely autonomous driving. In this case, the control unit 31 autonomously changes the route for which route guidance is performed to the candidate route K1 from the basic route R from the situation of the intersection to provide the candidate route K1 to the user.

REFERENCE SIGNS LIST

2 Vehicle
3 Autonomous driving control device
32 Storage unit
32a Map data
311 Route extraction unit
312 Determination unit
313 Autonomous driving control unit
R Basic route
K Candidate route

The invention claimed is:

1. An autonomous driving control device mounted on a vehicle and controlling autonomous driving, comprising:
   a storage unit that stores map information;
   a route extraction unit that extracts a plurality of routes from an origin to a destination based on the map information;
   a determination unit that determines whether or not to change to another route in response to a situation of an intersection when the vehicle approaches the intersection while the vehicle is traveling on one route of the routes extracted by the route extraction unit; and
   an autonomous driving control unit that controls autonomous driving based on determination of the determination unit,
   wherein the determination unit
   determines whether or not to change to the other route from the one route in accordance with a signal state of an intersection.

2. The autonomous driving control device according to claim 1,
   wherein the route extraction unit
   extracts a plurality of routes with differences in an estimated travel time period or a traveling distance being within a predetermined range.

3. The autonomous driving control device according to claim 1,
   wherein the determination unit
   determines to perform change to the other route from the one route by making a right turn in the intersection, when a signal of the intersection at a time of the vehicle arriving at the intersection indicates a right turn when change to the other route from the one route is performed by making the right turn in the intersection.

4. An autonomous driving control device mounted on a vehicle and controlling autonomous driving, comprising:
   a storage unit that stores map information;
   a route extraction unit that extracts a plurality of routes from an origin to a destination based on the map information;
   a determination unit that determines whether or not to change to another route in response to a situation of an intersection when the vehicle approaches the intersection while the vehicle is traveling on one route of the routes extracted by the route extraction unit; and
   an autonomous driving control unit that controls autonomous driving based on determination of the determination unit,
   wherein the determination unit
   determines whether or not change of a lane is possible when change of the lane is necessary to make a right or left turn when change to the other route from the one route is performed by making a right or left turn in an intersection, and when change of the lane is not possible, the determination unit determines not to perform change of the route.

5. The autonomous driving control device according to claim 4,
   wherein the determination unit
   acquires information concerning a white line formed on a road, and determines whether or not change of the lane is possible based on the acquired information.

6. The autonomous driving control device according to claim 4,
   wherein the route extraction unit
   extracts a plurality of routes with differences in an estimated travel time period or a traveling distance being within a predetermined range.

* * * * *